United States Patent [19]

Tsuda et al.

[11] 4,256,503

[45] Mar. 17, 1981

[54] METHOD FOR EFFECTIVELY UTILIZING WASTE TIRES

[75] Inventors: Akikazu Tsuda, Yokohama; Motokazu Kikuchi, Akigawa; Tadatoshi Shimazaki, Higashimurayama; Toshio Tsuji, Hinode; Shunro Ueda, Hinode; Masamichi Kabaya, Hinode, all of Japan

[73] Assignee: Bridgestone Tire Co., Ltd., Tokyo, Japan

[21] Appl. No.: 85,660

[22] Filed: Oct. 17, 1979

[30] Foreign Application Priority Data

Jan. 31, 1979 [JP] Japan .................................. 54-10167

[51] Int. Cl.³ .............................................. C04B 7/44
[52] U.S. Cl. ...................................... 106/100; 106/103
[58] Field of Search ................................. 106/100, 103

[56] References Cited

U.S. PATENT DOCUMENTS 4,081,285  3/1978  Pennell .................................. 106/103

Primary Examiner—James Poer
Attorney, Agent, or Firm—Sughrue, Rothwell, Mion, Zinn and Macpeak

[57] ABSTRACT

Waste tires are used in production of cement using a rotary kiln for saving the use of fuel by feeding waste tires as such or crushed waste tire pieces to the position where the temperature of the exhaust gas in this apparatus is 600°–1,400° C. in an amount of not more than 60% of the total used fuel calculated as heat energy.

3 Claims, No Drawings

METHOD FOR EFFECTIVELY UTILIZING WASTE TIRES

The present invention relates to a method for effectively utilizing waste rubbers, particularly waste tires as fuel in apparatuses for burning cement.

Recently, the treatment of used waste tires has become a great problem with development of automobile industry. Waste tires have been partially directly used effectively for fenders of ships and fish houses in sea but the amount of utilization is very small. When waste tires are subjected to burning treatment, public nuisance problems of black smoke, unpleasant odor, NOx, SOx and the like must be treated and the major part must be presently used for the laying treatment.

The inventors have studied the effective utilization of waste tires having heat energy of about 8,000 kcal/kg and the method for treating a large amount of such tires and the present invention has been accomplished.

The present invention comprises a method for effectively utilizing waste tires in an apparatus for burning cement using a rotary kiln, which comprises feeding waste tires or crushed waste tire pieces to a position where gas temperature in said apparatus is 600°–1,400° C., as a fuel in an amount of not more than 60% of the total used fuel calculated as heat energy.

It has been well known that in the production of cement, combustible substances, such as spoil and the like are charged in the apparatus for effectively utilizing the generated heat in the steps for preheating and calcining starting materials of cement or for solving the problem of NOx, but the combustible substance in this case is powder. While the size of waste tires charged in the present invention is the waste tire as such or crushed waste tire pieces of not less than 5 mm. The waste tire directly used without crushing is not limited in the size, if the tire can be charged into the rotary kiln. In general, tires for passenger cars, trucks, and buses are preferable. If waste tires are crushed to a size of less than 5 mm, the particles transfer mounting on gas flow and are burnt at the zone not necessary heat and the temperature of the exhaust gas is raised and the heat energy can not be efficiently used and the fan sucking the exhaust gas is thermally damaged or agglomeration occurs in a suspension preheater resulting in clogging of cyclone and the stable operation for a long period of time becomes difficult. The charging of an entire waste tire as such is more preferable than that of crushed waste tire pieces. Because, the finely crushed pieces are burnt near the back of the kiln but in the case of waste tire as such, the tire enters the inner portion of the rotary kiln and the burning zone is elongated, so that the reducing state advantageous for reducing the amount of NOx can be kept along a long zone. But in the case of the crushed pieces, the finely divided powdery tire admixed, so that there is fear that the stable operation for a long time is damaged as mentioned above. If a consideration is made in view of handling until charging, it is very difficult to crush the waste tire into a given shape by means of the presently known crusher and the crushed pieces are an irregular shape. Difficulties arise and a trouble is liable to be caused in the transferring system until charging into the kiln because of the elastic body, but in the case of the waste tire as such, the transferring means presently generally used in tire factory advantageously can be directly utilized.

When the waste tires or crushed waste tire pieces are charged into a zone where the temperature of the exhaust gas is higher than 600° C., they immediately start burning and concurrently a part thereof is subjected to dry distillation owing to heating to generate reducing combustible substances. The combustible substances reduce and decompose NOx generated from the main burner of the rotary kiln by using the starting materials for cement as catalyst and the burning of cement wherein the exhaust gas is low in NOx, can be effected. When the waste tires or crushed waste tire pieces are charged into a zone where the temperature of the exhaust gas is lower than 600° C., if the crushed particles are a fine size, said particles are transferred to a zone at a low temperature by the exhaust gas flow, and when the particles are coarse, the particles stay at that position and black smoke is generated due to the incomplete combustion, unpleasant odor is generated and NOx and SOx due to nitrogen and sulfur contained in the waste tire itself are generated.

When the waste tire is charged toward a zone where the temperature of the exhaust gas is higher than 1,400° C., for example the burning zone of the rotary kiln from the front of the rotary kiln, a large cost is necessary for obtaining finely divided powders. And in the case of granular or mass-shaped crushed pieces, the burning speed is slow, so that it is difficult to maintain the temperature of the burning zone. Particularly, in the case of mass-shaped crushed pieces or tire as such, charging into the burning zone becomes difficult. Accordingly, the position for charging waste tires in the apparatus for burning cement using a rotary kiln, as in the case of the rotary kiln alone, the waste tires are charged into the preheating zone or the calcining zone from the back or the side surface of the rotary kiln. In the case of the burning apparatus provided with cyclone system of preheater or calcining furnace, the waste tires are charged into the position where the temperature of the exhaust gas is higher than 600° C. in the accompanying installation for example the standing duct at the back of the rotary kiln or the calcining furnace, in addition to the above described positions.

The amount of waste tires or crushed waste tire pieces charged is one which does not hinder the burning of cement and is not more than 60% of the heat energy of the whole fuel. When the amount exceeds 60%, the stability of temperature at the burning zone in the rotary kiln becomes difficult and the quality of cement is adversely affected and such an amount is not preferable. In general, a few percent of zinc oxide (ZnO) is compounded in tires upon the production as a valcunization promoting assistant. It has been reported in 5th Cement Chemistry International Symposium Essay, Vol. 2, P. 444–453 that when more than 0.075% of ZnO is contained in cement, the setting of the cement is retarded. According to experiments, when ZnO is contained in an amount of more than 0.05%, the setting time defined in JIS R5201 is not satisfied and further an amount of unburnt carbon increases, so that the coating of the preheater grows and the cyclone is clogged. Therefore, an amount of waste tires or crushed waste tires charged is preferred to be not more than 15%, more preferably 5–10% of the heat energy of the whole fuel.

When steel is contained in the waste tire, steel is oxidized at the calcining zone and burning zone and effectively acts as a part of the starting material of cement.

The present invention has the following merits.

1. A large amount of waste tires can be treated.

2. Since waste tires are used as fuel, the heat energy of the rubber itself can be effectively utilized.

3. A very large cost is needed for obtaining finely divided tire powders but in the method of the present invention the object can be attained by roughly crushed pieces having a grain size of more than 5 mm, so that the treatment for obtaining such crushed pieces is simple.

4. The quality of the cement obtained is not adversely affected.

5. The secondary public nuisance due to burning of waste tires does not occur. Rather, the amount of NOx generated in the conventional burning of cement can be reduced.

6. Waste tires can be used directly without crushing waste tires, so that this method is advantageous in view of noise of crushing and cost.

7. Waste tires including steel can be directly used in the apparatus for burning cement.

The following examples are given for the purpose of illustration of this invention and are not intended as limitations thereof.

EXAMPLE 1

Waste tires were charged from the feeder of the starting material provided at a back of a wet system of rotary kiln having a diameter of 3,450 mm and a length of 66,300 mm and provided with a boiler. The obtained results are shown in Table 1. The waste tires contained 20% of steel.

TABLE 1

|  | Unit | Experiment 1 | 2 | 3 | 4 | 5 | 6 |
|---|---|---|---|---|---|---|---|
| Waste tire size | mm | — | 50–70 | 150–300 | 150–300 | 1> | 150–300 |
| Amount of waste tire used | kg/h | 0 | 250 | 1,000 | 1,600 | 250 | 3,000 |
| Amount of clinker produced | t/h | 20.0 | 20.0 | 20.0 | 20.0 | 20.0 | im- |
| Amount of heavy oil used | t/h | 3.200 | 3.036 | 2.543 | 2.149 | 3.175 | pos- |
| Amount of heavy oil used per amount of clinker produced | (kg/t) | 160.0 | 151.9 | 127.2 | 107.4 | 158.8 | sible |
| NOx in exhaust gas | ppm | 500 | 200 | 100 | 80 | 500 | burn- |
| Temperature of exhaust gas in kiln | °C. | 700 | 710 | 730 | 750 | 780 | ing |

When the size of the waste tires was not less than 50 mm and the amount of the waste tire used was less than 60% of the total used fuel calculated as heat energy, the amount of heavy oil and NOx in the exhaust gas considerably decreased as shown in Experiments 2, 3 and 4. On the other hand, when the size was less than 1 mm, as shown in Experiment 5 the amount of heavy oil used did not vary, the temperature of the exhaust gas of the kiln was high and this case did not act effectively as fuel, when the used amount is more than 60% of the total used fuel calculated as heat energy, as shown in Experiment 6 the temperature at the burning zone was not stable and the burning was infeasible.

EXAMPLE 2

Waste tires were charged from the upper portion (gas temperature: about 1,000° C.) of the combined point of the exhaust gas of the kiln and the gas discharged from the cooler, said rotary kiln having a diameter of 5,250 mm and a length of 84,000 mm and provided with a calcining furnace and a suspension preheater. The obtained results are shown in Table 2. The waste tires contained 20% of steel.

TABLE 2

|  | Unit | Experiment 1 | 2 | 3 | 4 | 5 |
|---|---|---|---|---|---|---|
| Waste tire size | mm | — | 10–20 | 50–100 | 10–20 | 1> |
| Amount of waste tire used | kg/h | 0 | 5,400 | 5,400 | 1,000 | 1,000 |
| Amount of clinker produced | t/h | 230 | 230 | 230 | 230 | 230 |
| Amount of heavey oil used | t/h | 17.20 | 13.38 | 13.40 | 16.53 | 16.90 |
| Amount of heave oil used per amount of clinker produced | kg/t | 75.0 | 58.2 | 58.3 | 71.9 | 73.4 |
| Temperature of exhaust gas in preheater | °C. | 380 | 390 | 392 | 381 | 410 |
| NOx in exhaust gas | ppm | 250 | 200 | 200 | 240 | 250 |

When the size of the crushed waste tires was not less than 10 mm and the amount of the waste tires was not more than 60% of the total used fuel calculated as heat energy, the amount of heavy oil used and NOx in the exhaust gas considerably decreased as shown in Experiments 2, 3 and 4. On the other hand, when the size was less than 1 mm, as shown in Experiment 5, the amount of heavy oil used did not vary and the temperature of the exhaust gas has elevated. That is, in this case, the waste tires did not act effectively as fuel. Since the temperature of the exhaust gas elevated, it was impossible to more increase the charging amount.

EXAMPLE 3

A shoot provided with air seal for crushed tire pieces (size; 150–300 mm) or tire (diameter: 770 mm, breadth: 195 mm) was provided at side of shoot for starting material entering four stages (lowest stage) of cyclone of rotary kiln (NSP) having a diameter of 5,250 mm and a length of 84,000 mm and provided with a calcining furnace and a suspension preheater and crushed waste tire pieces or waste tires were charged therein.

In addition, crushed waste tire pieces (size: 150–300 mm) were charged from a starting material feeder provided at the back of rotary kiln (WFB) having a diameter of 3,450 mm and a length of 66,300 mm and provided with a wet system of boiler into the kiln. In any case, the tire contained 20% of steel and the heat energy of this tire was 7,500 kcal/kg, which corresponds to 77% of heat energy of 1 kg of heavy oil.

The obtained results are shown in Table 3, concerning the quality of cement, gypsum was added to the obtained clinker so that $SO_3$ content in the cement becomes 2.2% and the mixture was crushed with a pot mill for laboratory to obtain test cement and then the test cement was evaluated by the mortar test of JIS R5201. The other results were measured during operation.

cyclone do not substantially occur and the temperature of the exhaust gas does not elevate.

Furthermore, the rotary kiln (SP) provided with suspension heater, which is not provided with the calcining furnace showed the similar results to NSP.

What is claimed is:

1. A method for effectively utilizing waste tires in an apparatus for burning cement by means of a rotary kiln, comprising the steps of; charging waste tires directly without crushing or crushed waste tire pieces as fuel to a position in said kiln where the gas temperature in this apparatus is 600°–1,400° C., said charging in an amount not exceeding 60% of the total fuel use calculated as heat energy.

2. The method as claimed in claim 1, wherein the amount of the waste tires or crushed waste tire pieces is not more than 15% of the total fuel use calculated as heat energy.

3. The method as claimed in claim 1, wherein said amount of charging is 5–10% of the total fuel use calculated as heat energy.

* * * * *

TABLE 3

| | Experiment | | | | | | | | |
|---|---|---|---|---|---|---|---|---|---|
| | 1 | 2 | 3 | 4 | 5 | 6 | 7 | 8 | 9 |
| Kind of rotary kiln | NSP | | | | | | | WFB | |
| Amount of waste tire charged calculated as heat energy, % | 0 | 5 | | 10 | | 15 | 20 | 0 | 10 |
| per time, kg/H | — | 1,140 | 1,140 | 2,280 | 2,280 | 3,420 | 4,500 | — | 420 |
| Shape of tire | | crushed piece | tire | crushed piece | tire | crushed piece | crushed piece | | crushed piece |
| Production of clinker (t/H) | 230 | 230 | 230 | 230 | 230 | 230 | 230 | 20.0 | 20.0 |
| Amount of heavy oil used (t/H) | 17.20 | 16.48 | 16.51 | 15.72 | 15.79 | 14.88 | 13.89 | 3.20 | 2.88 |
| Amount of heavy oil used per amount of clinker produced (kg/t) | 74.8 | 71.7 | 71.8 | 68.3 | 68.7 | 64.7 | 60.4 | — | — |
| Temperature of exhaust gas in kiln (°C.) | 380 | 380 | 380 | 382 | 381 | 386 | 391 | 700 | 700 |
| NOx in exhaust gas (ppm) | 250 | 240 | 220 | 240 | 190 | 230 | 200 | 500 | 200 |
| Quality of cement | | | | | | | | | |
| Setting time: Start (hour-minute) | 2–17 | 2–22 | 2–20 | 2–55 | 3–00 | 3–50 | 8–30 | 2–15 | 2–45 |
| Finish (hour-minute) | 3–09 | 3–28 | 3–25 | 4–00 | 4–15 | 5–25 | 11–00 | 3–20 | 3–55 |
| Strength of mortar | | | | | | | | | |
| 28 days, kg/cm$^2$ | 405 | 403 | 407 | 408 | 415 | 432 | 510 | 411 | 430 |

As seen from Table 3, when the amount of waste tire charged increases, the setting time of the obtained cement becomes longer and does not satisfy the cement quality (starting time of setting: more than 1 hour, finishing time: within 10 hours) defined in JIS. The coating growth of preheater and clogging of cyclone owing to increase of unburnt carbon occur frequently and the continuous safe operation for a long period of time becomes difficult. Accordingly, the amount of waste tires charged must be not more than 15% of the total used fuel calculated as heat energy and 5–10% is preferable taking the saving of the amount of heavy oil into consideration. In comparison with the use of crushed waste tire pieces, when the tire is charged directly, the growth of coating of the preheater and clogging of the